Figure 1:
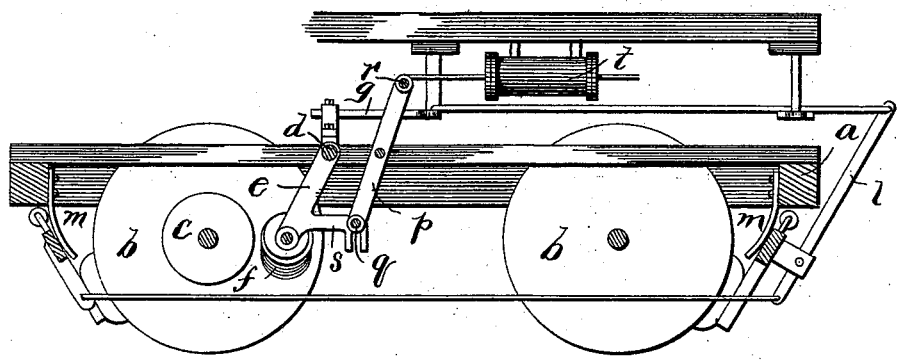

(No Model.)

G. R. ELLIOTT.
CAR BRAKE.

No. 533,005. Patented Jan. 22, 1895.

WITNESSES:
E. C. Duffy
Hubert D. Peck

INVENTOR
G. R. Elliott
BY J. E. Duffy
ATTORNEY.

UNITED STATES PATENT OFFICE.

GILBERT R. ELLIOTT, OF BOSTON, MASSACHUSETTS, ASSIGNOR TO THE ELLIOTT AIR BRAKE COMPANY, OF PHILADELPHIA, PENNSYLVANIA.

CAR-BRAKE.

SPECIFICATION forming part of Letters Patent No. 533,005, dated January 22, 1895.

Application filed March 23, 1894. Serial No. 504,809. (No model.)

*To all whom it may concern:*

Be it known that I, GILBERT R. ELLIOTT, of Boston, in the county of Suffolk and State of Massachusetts, have invented certain new and useful Improvements in Car-Brakes; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in car brakes.

The object of the invention is to provide certain improvements in that class of car brakes wherein the rotary threaded shaft or drum is arranged on an axle or other moving part and the laterally movable traveler is provided controlling the braking apparatus and arranged to be thrown into and out of engagement with said drum by suitable means under the control of the engineer or trainmen whereby the apparatus is rendered more simple, durable and effective.

The invention consists in certain novel features of construction and in combinations of parts described hereinafter and pointed out in the claims.

Figure 2:
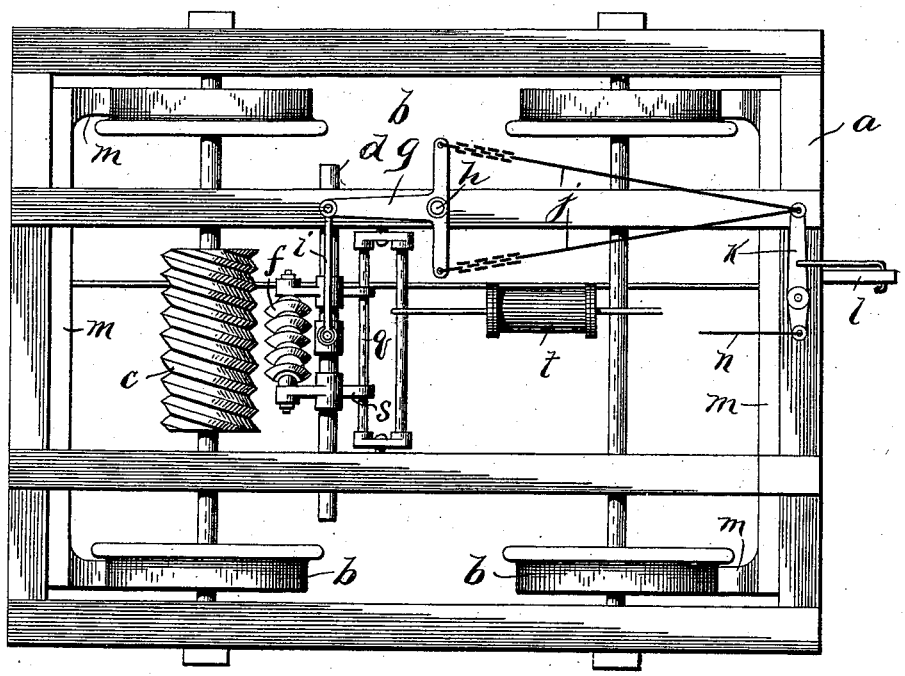

Referring to the accompanying drawings:—
Figure 1, is a vertical sectional view through the car truck showing a portion of the floor of the car. Fig. 2, is a top plan view of the truck of the car provided with the present invention.

In the drawings the reference letter $a$, indicates the car truck frame.

$b$, indicates the car wheels having their usual axles.

$c$, is the drum or cylinder rigid with one of the car wheel axles and exteriorly threaded preferably throughout its entire length in one direction.

$d$, is a lateral sliding support, here shown as a horizontal rod arranged parallel with the cylinder $c$. and sliding transversely through beams of the truck. A pair of swinging hangers $e$, depend from the rod $d$, and are provided with a roller $f$, journaled therein and supported thereby so that the roller can be swung into and out of engagement with the threaded drum or cylinder $c$. This roller is provided with the peripheral parallel ribs or grooves and the roller is tilted or inclined longitudinally in such a position that the said ribs can enter the threads of the threaded drum $c$, whereby the roller and rod $d$, will be moved longitudinally and transversely of the car truck. This roller and its supporting parts constitutes the traveler controlling the braking mechanism of the car.

$g$, is a three arm horizontally movable lever arranged opposite the traveler and pivotally connected therewith by the link $i$, so that the three arm lever will be swung horizontally by the movement of the traveler. The other arms of this three arm lever are both connected by suitable connections $j$, with the same end of the brake lever $k$, which brake lever is suitably connected with the levers $l$, controlling the brake beams and shoes $m$. The lever $k$, can also be connected in any suitable manner as by rod $m$, with the brake levers of adjacent trucks.

The brake beams and their operated connections can be arranged and connected in any suitable manner, and it is not necessary to herein specifically describe any particular construction or arrangement.

It is sufficient to say that the transverse movement of the traveler swings the three armed lever in opposite direction and that said three arm lever will swing the lever $k$, to apply the brakes which ever direction the three arm lever is swung, the normal positions of the parts being shown in Fig. 2, wherein the traveler is arranged about opposite the central portion of the threaded drum, and the brakes are released.

$p$, is a lever arranged in an upright position and having its ends fulcrumed between their extremities in the frame of the car truck and having their extremities connected by the rods $q$, $r$. The hangers $e$, have rearward extensions $s$, loosely confined to the lower rod $q$, of said swinging lever frame $p$, so that the arm $s$, can slide thereon and the said lever frame will control the position of the traveler roller toward or from the threaded drum.
The upper rod of the lever frame can be connected with the air cylinder $t$, so that the traveler can be thrown into and out of engagement with the threaded drum through the medium of said cylinder and its piston.

The simplicity and durability of the present arrangement are obvious, and the friction is reduced to a minimum by the employment of the roller traveler and also the simplicity, effectiveness and durability of the device is increased by the employment of the three arm lever.

It is evident that various changes might be made in the forms, arrangements and construction of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. In a car brake, the combination of the threaded rotary drum, a support swinging toward and from the drum, guides on which said supports slide parallel with the drum, and the ribbed rotary roller carried by said support and arranged to be thrown thereby into and out of mesh with the drum, substantially as described.

2. In a car brake, the combination of the threaded driving drum, a traveler arranged to move parallel with the drum and mounted to swing toward and from the same and provided with the ribbed roller to mesh with the drum and means for controlling the movement of the traveler to and from the drum, substantially as described.

3. The combination of the threaded drum, with the traveler movable parallel to the drum and provided with an inclined ribbed roller, the traveler movable toward and from the drum to throw the roller into and out of mesh with the thread of the drum, substantially as described.

4. The combination of the threaded driving drum, a depending traveler movable parallel to the drum with its lower end movable toward and from the drum and having the ribbed roller mounted in its lower end to move into and out of mesh with the drum, said traveler connected to control the brake apparatus, and the swinging lever on which said traveler slides and arranged to swing the traveler, as set forth.

5. The combination of the rotary threaded drum, the movable support to the drum, hangers depending from the support, the ribbed roller journaled in the lower portions of said hangers at an angle, said support connected to the brake apparatus, the swinging frame having controlling means, the hangers having rearwardly extending arms sliding on said frame.

6. In a car brake, the combination of the rotary threaded drum, the traveler movable toward and from the drum and arranged to be moved thereby parallel to the drum, a swinging frame controlling the swing of the traveler, and the horizontal three-armed lever having its two opposite arms connected to one end of the brake lever, and a link from the remaining arm of the brake lever to said traveler as set forth.

In testimony that I claim the foregoing as my own I affix my signature in presence of two witnesses.

GILBERT R. ELLIOTT.

Witnesses:
   O. E. DUFFY,
   C. M. WERLE.